Nov. 7, 1950          J. L. BINKLEY          2,528,996
CORN PLANTER
Filed June 13, 1947          2 Sheets-Sheet 1
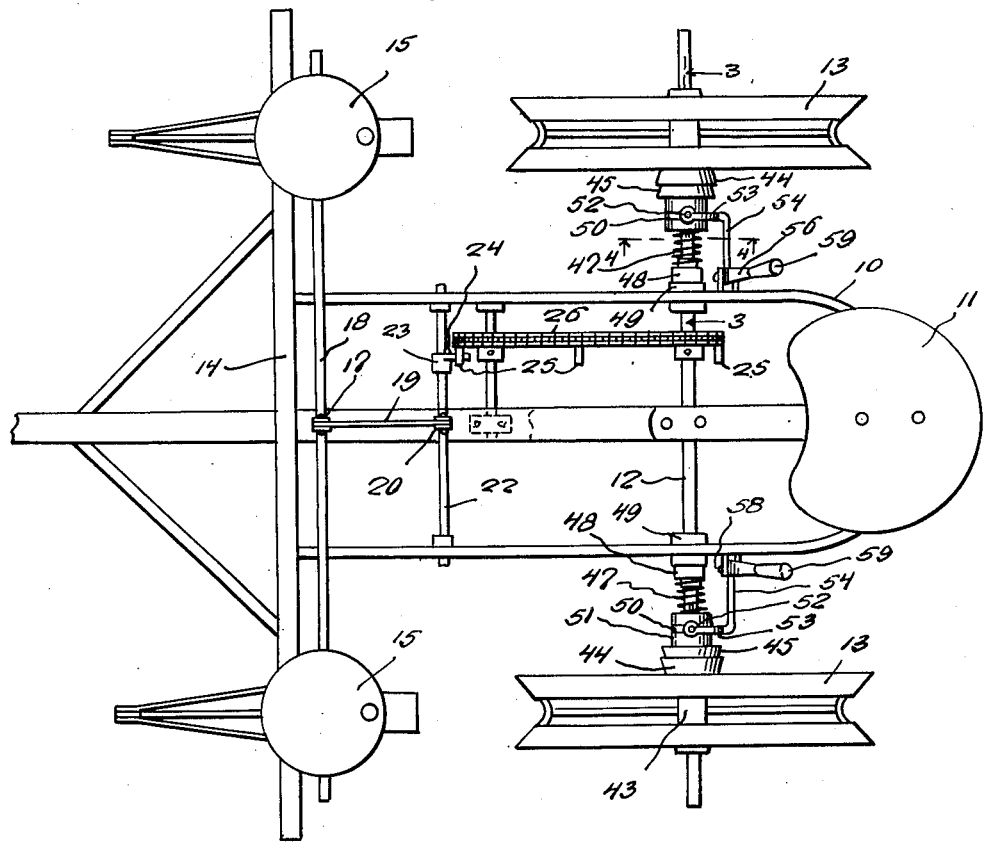
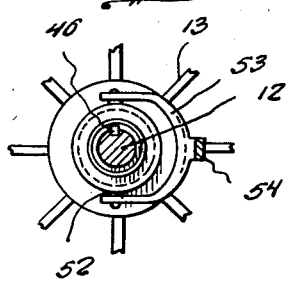
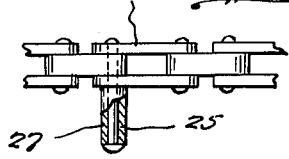
Inventor
James L. Binkley,
By McMorrow, Berman & Davidson
Attorneys Nov. 7, 1950  J. L. BINKLEY  2,528,996
CORN PLANTER Filed June 13, 1947  2 Sheets-Sheet 2

Inventor
James L. Binkley,

By McMorrow, Berman & Davidson
Attorneys

Patented Nov. 7, 1950

2,528,996

UNITED STATES PATENT OFFICE 2,528,996

CORN PLANTER

James L. Binkley, Lima, Ohio

Application June 13, 1947, Serial No. 754,381

1 Claim. (Cl. 275—9)

This invention relates to a corn planter, and more particularly to an attachment adapted to be utilized with corn planters for the accurate check-rowing of corn.

A primary object of this invention is the provision of a corn planter characterized by means for accurate spacing and alignment of corn hills or the like.

A further important object of the invention is the provision of means in association with a corn planter for insuring the accurate alignment of rows after each turning operation at the end of the field.

A further object of the invention is the provision of means whereby upon the turning of the planter at the end of a row or rows, the spacing is continued accurately in such manner that subsequent rows started upon the completion of the turning are substantially aligned with the previous rows.

Still other objects reside in the combinations of elements, arrangements of parts, and features of construction, all as will be more fully pointed out hereinafter and disclosed in the accompanying drawings, wherein there is shown a preferred embodiment of this inventive concept.

In the drawings:

Figure 1 is a top plan view of one form of planter embodying features of the instant invention.

Figure 4 is an enlarged sectional view taken substantially along the line 4—4 of Figure 1, as viewed in the direction indicated by the arrows.

Figure 5 is an enlarged fragmentary plan view of a detail of construction, certain portions thereof being in section.

Similar reference characters refer to similar parts throughout the several views of the drawings.

Figure 2:
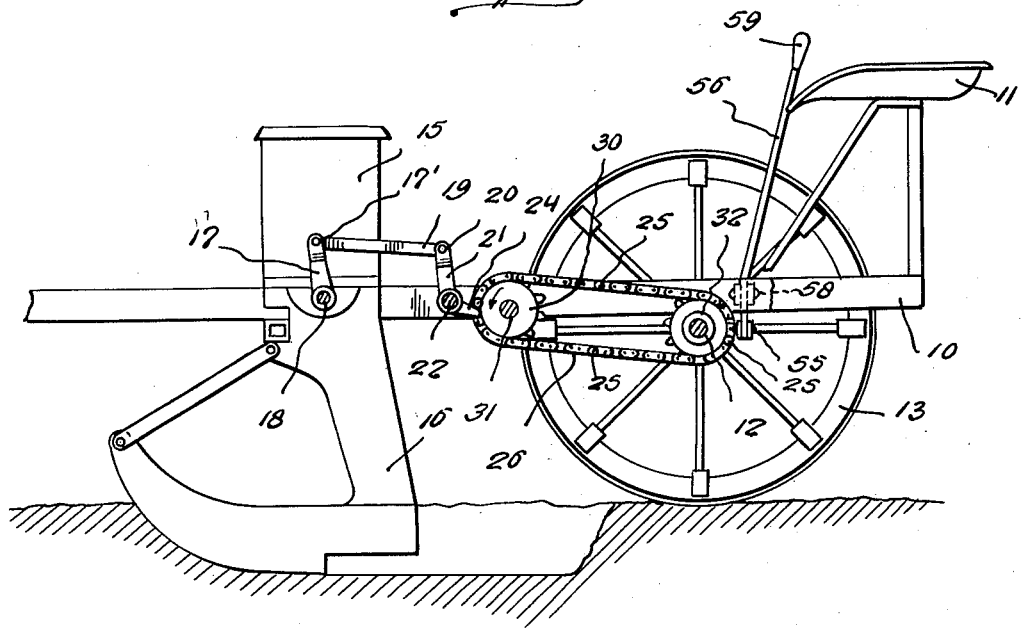
Figure 2 is a side view, partially in elevation, and partially in section, of the construction shown in Figure 1.

Referring now to the drawings in detail, and more particularly to Figures 1 and 2, there is disclosed a conventional corn planter, including a main frame 10, supporting a driver's seat 11 of conventional design, and provided with a rear axle 12, upon which are rotatably mounted wheels 13. The frame includes a transverse front member 14 and conventional seed hoppers 15 supported thereby and provided with seed boots 16 to which seeds are adapted to be fed by conventional valves of any desired type, the valves being operable by a lever 17, mounted on an axle 18. The lever 17 is connected, as by a pivot 17', to a link 19 connected at its opposite end, as by a pivot 20, to a lever 21 mounted on a shaft 22 extending transversely across the frame 10.

The shaft 22 carries a collar 23 provided with a trip lever 24 adapted to be tripped by pins 25 positioned at spaced intervals along a chain 26. As best shown in Figure 5, each pin 25 comprises merely an elongation of the rivets normally holding the associated links of the chain in related assembly and surrounded by a bushing or collar 27.

The chain 26 rotates about a sprocket 30 carried by a stub axle 31 supported by the frame 10, and at its opposite extremity about a sprocket 32 fixedly secured to the axle 12. Thus, it will be seen that as the axle 12 is rotated, the chain 26 is correspondingly rotated, and as each pin 25 engages trip lever 24, the lever 21 is moved in the direction indicated by the arrows in Figure 2, which correspondingly moves the lever 17 to drop seeds from the associated hoppers through the seed boots and plant the same. The spacing of the pins 25 may be as desired by the individual operator, but are preferably so arranged as to provide for a planting for every three feet of travel of the planter.

Figure 3:
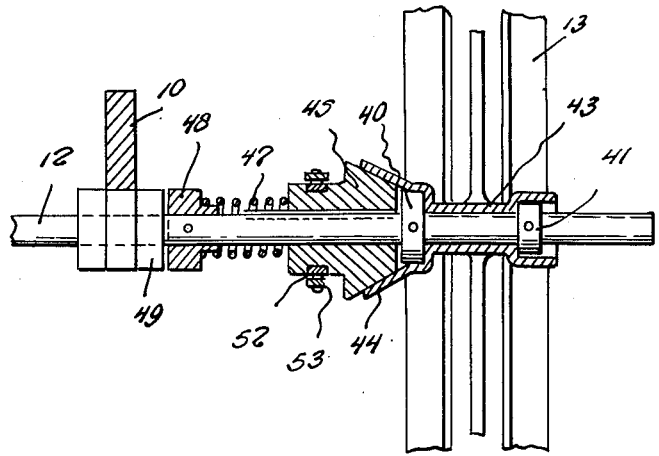
Figure 3 is an enlarged sectional view taken substantially along the line 3—3 of Figure 1, as viewed in the direction indicated by the arrows.

As best shown in Figure 3, it will be seen that the axle 12 is provided at each end with a pair of spaced collars 40 and 41, securedly pinned thereto and adapted for the reception of the hubs 43 of the wheels 13, the arrangement being such that the wheels are normally freely rotatable about the axle. Each hub 43 is provided on its inner side with a female cone clutch member 44 provided interiorly with splines 14, and adapted for coaction with a corresponding male clutch member 45 similarly provided with splines 14 and keyed, as by means of a key and keyway 46 to axle 12 (see Figures 3 and 4).

The male clutch member 45 is normally biased, as by a compression spring 47, toward female clutch member 44, the spring bearing at its opposite end adjacent a bearing 48, which in turn bears against the journal 49 for axle 12 carried by frame 10.

Means are provided for moving the male clutch members 45 out of engagement with the female clutch members, and take the form of grooves or channels 50 in rearwardly extending cylindrical portions 51 of the male clutch member, the grooves being adapted to be engaged by pins 52 carried by a fork 53 secured to a bar 54 extending in parallelism to the axle 12, and pivotally connected, as at 55, to the extremity of an operating lever 56 pivotally connected, as by a pivot 58, to frame 10, and terminating in operating handle 59. Obviously, outward movement of the operating handle 59 will cause inward movement of the male clutch member relative to the frame, thus disengaging the clutch from its associated wheel and permitting independent rotation of the associated wheel 13 about the axle 12.

In normal operation of the device, it will be readily apparent that when both clutches are engaged and the planter traveling in a straight line, the axle will be rotated to actuate chain 26, and hence the seed hopper valves. When it is desired to discontinue the planting, both clutches may be disengaged, and the wheels rotated freely without affecting movement of the axle.

However, when turning at the end of a row, if the turn is to the right, the right clutch may be disengaged, the turning of the left wheel continuing the axle, and hence the spacing of the seeds in such manner that the spacing will not be interrupted when the vehicle has completed the turn.

Correspondingly, upon left turning, the left clutch may be disengaged to insure spaced and even planting throughout curved rows or the like.

Thus, it will be seen that regardless of direction of travel of the vehicle, whether in straight lines, or curves, or the like, even planting and evenly spaced hills are assured.

From the foregoing it will now be seen that there is herein provided an improved corn planter which accomplishes all the objects of this invention, and others, including many advantages of great practical utility and commercial importance.

As many embodiments may be made of this inventive concept, and as many modifications may be made in the embodiment hereinbefore shown and described, it is to be understood that all matter herein is to be interpreted merely as illustrative and not in a limiting sense.

I claim:

In a planter, a wheeled support, seed-dispensing mechanism mounted upon the support near the front end thereof and including a first horizontal rock shaft extending transversely of the support, a vertically swingable crank arm secured to said rock shaft, a second horizontal rock shaft journaled upon the support and extending transversely thereof and parallel to the first rock shaft and arranged substantially at the elevation of the first rock shaft, the second rock shaft being spaced rearwardly of the first rock shaft, a crank arm secured to the second rock shaft and arranged in substantial alignment with the crank arm of the first rock shaft, a substantially horizontal link connecting the crank arms of the first and second rock shafts and extending longitudinally of the support, a radial trip lever secured to the second rock shaft and spaced laterally of the crank arm of the second rock shaft, a horizontal stub shaft journaled upon the support rearwardly of the second rock shaft and disposed at substantially the same elevation as the first and second rock shafts and parallel thereto, the wheeled support including a horizontal rotatable axle disposed rearwardly of said stub shaft and near the elevation of the stub shaft and parallel with the first and second rock shafts and stub shaft, aligned sprocket wheels secured to the stub shaft and axle and positioned adjacent to the trip lever of the second rock shaft, an endless sprocket chain mounted upon the sprocket wheels and driven by rotation of the axle, and pins secured to the sprocket chain and spaced longitudinally thereof and extending beyond one side of the sprocket chain for engagement with the trip lever to turn the first and second rock shafts in unison.

JAMES L. BINKLEY.

REFERENCES CITED

The following references are of record in the file of this patent:

UNITED STATES PATENTS

| Number | Name | Date |
| --- | --- | --- |
| 242,063 | Sidener | May 24, 1881 |
| 489,446 | Anderson | Jan. 10, 1893 |
| 593,647 | Gist | Nov. 16, 1897 |
| 667,629 | Kelley | Feb. 5, 1901 |
| 750,729 | Storrs | Jan. 26, 1904 |
| 824,176 | Devenney | June 26, 1906 |
| 857,798 | Fidler et al. | June 25, 1907 |
| 953,870 | Todd | Apr. 5, 1910 |
| 1,078,121 | Amussen | Nov. 11, 1913 |
| 1,216,419 | Dial | Feb. 20, 1917 |
| 1,637,212 | Boddiger | July 26, 1927 |
| 1,678,758 | Barclay | July 31, 1928 |
| 2,071,708 | Rhodus | Feb. 23, 1937 |
| 2,103,129 | White | Dec. 21, 1937 |
| 2,178,053 | Stout | Oct. 31, 1939 |